April 7, 1925.
R. STRESAU
1,532,842
PROCESS OF UNITING THICK METAL PLATES BY ELECTRIC WELDING
Filed Jan. 12, 1923
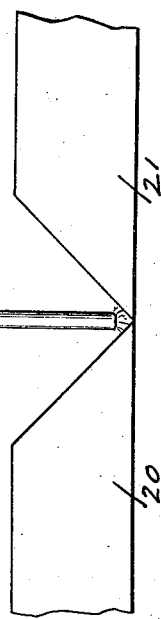
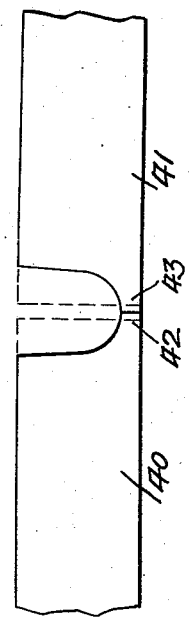
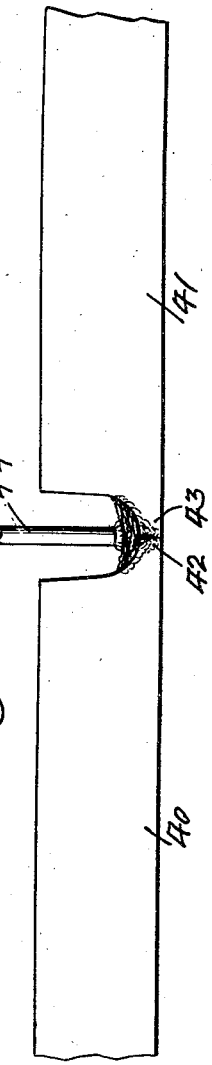
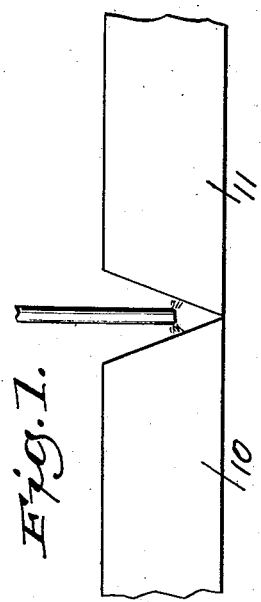
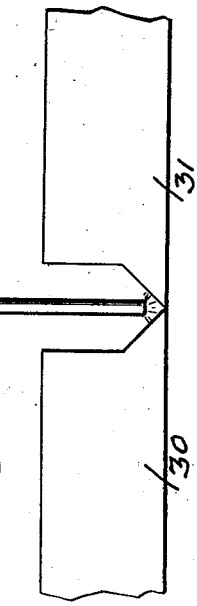
INVENTOR.
Richard Stresau,
BY
ATTORNEYS.

Patented Apr. 7, 1925.

1,532,842

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

PROCESS OF UNITING THICK METAL PLATES BY ELECTRIC WELDING.

Application filed January 12, 1923. Serial No. 612,264.

*To all whom it may concern:*

Be it known that I, RICHARD STRESAU, a citizen of the United States, and a resident of the city of Wauwatosa, county of Milwaukee, and State of Wisconsin, have invented certain new and useful Improvements in Processes of Uniting Thick Metal Plates by Electric Welding; and I do declare the following to be a clear, exact, and complete description thereof, such as will enable others skilled in the art to which my invention relates to use the same, reference being had to the accompanying drawing, as illustrative of the manner in which my invention is reduced to practice.

My invention relates to an improved method of electric butt welding which involves a preliminary preparation of the edges of metal plates which are to be joined, the fusion and welding of such edges being effected by an electric arc formed at the point of a destructible weldrod, which conducts the welding current.

Much difficulty has been experienced heretofore in welding the edges of abutting metal plates of excessive thickness, by reason of the inability of the heat generated in the arc to penetrate the metal plates to the distance required to thoroughly fuse the abutting edges without burning away the metal.

In order to overcome the difficulty, it has been the practice to chamfer or mill the edges of the plates, so that when brought together in abutting relation a deep groove was formed for the purpose of enabling the arc to fuse the thinned edges of the plates at the bottom of the groove. Such V-shaped groove as ordinarily formed was narrow, as a matter of economy in the milling operations and in the quantity of welding metal required to fill the groove, and make a joint which was satisfactory from the standpoint of appearance. But under such conditions the arc did not play directly upon the thin edges of the plates at the bottom of the narrow V-groove, but would attack the metal at the sides thereof by reason of the shorter distance to be traveled when the arc was struck. As a result, the thin edges of the plates at the bottom of the groove were not as completely fused as was to be desired, and it was found that the molten metal flowing from the fusible weldrod was, in some instances, merely cast in the bottom of the groove without completely welding the plates at that point. An imperfect joint was thus produced.

Attempts to overcome this difficulty were made by widening the V-shaped groove, so that the free end of the weldrod could approach the bottom of the groove, and permit the arc formed at the point of the weldrod to first completely fuse the thin edges of the plates at the bottom of the groove. But this practice necessitated the cutting away of a larger amount of material from the edges of the plates and an excessive consumption of the weldrod, when the metal flowing from the latter was used to form a filler for the groove.

Later, it was my practice to mill the edges of the plates so that the upper side walls of the narrow groove were parallel or substantially so for a good part of their extent and with only the lower meeting edges chamfered or beveled to produce the desired thinness. When the plates were assembled, the point of the weldrod could be inserted into the bottom of the narrow groove and, by reason of the shorter distance, the arc could first play upon the thinned edges of the plates and fuse them so as to form the base for a perfect weld, as disclosed in my application filed January 12, 1923, Serial No. 612,263. But this practice of so preparing the plates also required extensive milling operations, which notwithstanding its advantages increased the cost of the finished product.

My present invention contemplates the shaping of the edges of thick metal plates so that when brought into abutting relation a narrow welding groove having parallel or substantially parallel side walls with thin edges meeting at the bottom of the groove will be formed. By this present arrangement, the point of the weldrod is permitted to closely approach the bottom of the groove and yet be sufficiently removed from contact with the side walls thereof, so that the arc when struck will first play upon the beveled or chamfered thin edges of the plates at the bottom of the groove, and fuse the same in such complete degree that an entirely satisfactory weld will be produced.

I carry out the invention by assembling the plates with their squared edges in proximity, but preferably leaving a small open space between them. The plates are then clamped in position, and by means of a punching die actuated by a powerful press, I compress the metal of the plates at the upper contiguous edges in the line of the joint. In such operation, when the punching die has made its stroke, a deep groove will be formed having at the bottom two thin edges extending from the plates toward each other, the metal at the lower sides of the plates flowing under the pressure exerted until the space separating the plates is closed or partly closed. Thereby, I form a narrow groove but one having a width sufficient to permit the current carrying fusible weldrod to be entered with its point immediately adjacent to the thin edges, so that the arc will first play upon such edges, and fuse the metal constituting the said edges to effect a complete welding of the same. This initial welding is then followed by traversing the weldrod until the molten metal flowing therefrom, deposited in the successive layers, has completely filled the groove, and constituted an integral structure of even surface. In the traversing movements of the weldrod across the width of the groove, as well as lengthwise thereof, the arc fuses the metal of the plates forming the vertical walls of the groove, so that at the completion of the welding operation a perfect joint is produced, which tests have shown to be superior in strength to that of the plates themselves. The great advantage which flows from the use of the present invention, resides in the elimination of the time consuming and costly operations of milling the edges of the plates to be welded and the replacement of such operations by a simple, expeditious stamping operation, whereby there is produced a welding groove so contracted that to fill it a minimum amount of welding material is required.

In the drawing which accompanies this specification,

Figure 1 shows an ordinary method of butt welding thick metal plates with their edges beveled to form a narrow V-shaped welding groove, but which is objectionable for the reasons heretofore referred to.

Fig. 2 shows an improvement in the operation shown in Fig. 1, in that a perfect weld may be attained, but which is also objectionable in the particular that an excessive amount of welding material is required to fill the wide V-shaped groove and complete the weld.

Fig. 3 shows the third method of obtaining the results, this figure showing thick metal plates the abutting edges of which have been subjected to milling operations to produce a narrow, parallel sided groove for welding in a more economical manner.

Fig. 4 is a view showing the manner of reducing my present invention to pratice, whereby the welding groove may be produced in the contiguous edges of plates to be welded by a simple stamping operation.

Fig. 5 illustrates the manner in which the welding is effected.

In the drawing, Fig. 1 illustrates the older method of beveling by milling the edges of the thick gauge plates 10 and 11, at an angle of about 22½° from the perpendicular, so as to form a narrow V-shaped welding groove having a 45° opening at the juncture of the plates to be welded. This method is not satisfactory, inasmuch as the point of the weldrod cannot approach the bottom of the groove before contacting with the sides thereof. From this condition it results that the arc will not reach the bottom of the groove, but will play upon the sides thereof some distance from the bottom. Under such conditions the thin contacting edges at the lower side of the plates are only partially fused, and the metal flowing from the fusible weldrod does not form a weld at that point, but appears in many instances as a cast filling at the bottom of the groove. As the imperfect weld formed at the bottom of the groove is built up to a level over which the arc can play transversely, the actual welding begins and from that point to the top level of the plates the metal at the sides of the groove is fused as the welding proceeds. The defect described has caused this manner of forming the groove to be discarded, on account of its inefficiency, notwithstanding the economical welding involved in its practice.

Fig. 2 shows a development of the later method whereby the edges of the plates 20 and 21 are cut away at a greater angle so as to form a wide V-shaped welding groove having an opening of about 90°, to permit the point of the weldrod to be inserted at the bottom of the groove, so that the arc will first fuse the lower thin edges of the plates. But this method is objectionable in that an excessive quantity of welding material is required to be supplied and fused in a wasteful consumption of electric current in order to fill the groove and complete the weld.

Fig. 3 illustrates a later development involving a much more economical method of welding, as disclosed in my aforesaid application for patent, in that the edges of the plates 30 and 31 are milled so that their sides stand in parallelism or substantial parallelism for a greater portion of their height, with the projecting edges at the bottom beveled substantially as in Fig. 2, to present the desired thin edges at the bottom of the groove and permit a satisfactory operation of the welding arc. The narrowed groove thus produced requires a less quantity of welding material to fill the groove and complete the weld. But this method is less desirable in view of the expense involved in the time consuming and costly operations of milling the edges of the plates to form the groove and prepare them for welding.

Fig. 4 shows my present invention, in the practice of which the welding groove is formed in a most economical and expeditious manner. In carrying out the invention, I assemble two separate plates 40 and 41 with their edges in proximity, but slightly separated, as shown by the dotted lines outlining the ends of the plates. The plates are then firmly clamped in an immovable position, and by means of a die operated by a powerful press, I compress the ends of the plates in the region adjacent the separating space so as to change the configuration of the said ends from that shown by dotted lines to the grooved formation indicated by the full lines. In the compression thus exerted, the lower edges of the plates are caused to flow in the extrusion of the metal, and are advanced toward each other or until they meet, the result being that the separate plates 40 and 41 are formed with thin projecting edges 42 and 43 at their lower sides, to form the bottom of the welding groove.

The plates 40 and 41, after milling, are placed in a welding machine, the edges 42 and 43 remaining in abutting or proximate relation. I prefer to employ a fusible weldrod 44, as distinguished from an electrode of fixed composition, to conduct the welding current to effect the weld. The width of the narrow groove needs only to be such that the point of the weldrod may be readily entered to the depth thereof without diversion of the arc to the side walls of the groove, so that the welding arc may first completely fuse the thin edges 42 and 43, of the plates to institute the foundation of a complete weld. As the molten metal flowing from the weldrod fills the groove, the weldrod is traversed across the welding line, the metal at the sides of the groove being fused in the operation, until by successive layers of molten metal the groove is filled and the thoroughly welded joint completed.

Having thus described my invention, what I claim and desire to secure by Letters Patent of the United States, is:

1. In electric arc welding, the process of uniting separate metal plates which consists in arranging in proximity the edges of plates to be united, compressing the metal of the plates in the line of their adjacent edges to form a welding groove, and fusing the edges of the plates in the region of such groove to weld the plates into an integral structure.

2. In electric arc welding, the process of uniting separate metal plates which consists in arranging in proximity the edges of thick metal plates to be united, compressing the metal of the plates in the line of their adjacent edges to form a welding groove the bottom of which is formed by the thinned edges of the plates, and fusing the edges of the plates in the region of such groove to weld the plates into an integral structure.

3. In electric arc welding, the process of uniting separate metal plates which consists in arranging the edges of thick metal plates adjacent each other so as to provide a separating space, compressing the metal of the plates to close the separating space at the lower side of the plates and form a welding groove in the line of such edges, and fusing the edges of the plates in the region of such groove to weld the plates into an integral structure.

4. In electric arc welding, the process of uniting metal plates which consists in arranging thick metal plates with their spaced edges in proximity, compressing the metal of the plates in the area of such edges to advance the metal at the lower side of the plates and form a closed welding groove in the line of such edges, fusing the said edges in the region of such groove by means of an arc conducted by a fusible weldrod, and filling the said groove by molten metal flowing from the weldrod, to weld the plates into an integral structure.

5. In electric arc welding, the process of uniting separate thick metal plates which comprises the steps of forming a welding groove by compression of the edges of adjacent metal plates into thin edges which extend toward each other at the bottom of the groove, fusing said thin edges and the metal of the plates in the region of the groove and filling the latter with welding material to weld the plates into an integral structure.

6. In electric arc welding, the process of uniting separate thick metal plates which comprises the steps of forming a welding groove by compression of the edges of adjacent metal plates to form thin edges which extend toward each other at the bottom of the groove, fusing said thin edges and the metal of the plates in the region of the groove by means of an arc conducted by a fusible weldrod, and filling the groove by molten metal flowing from the weldrod, to weld the plates into an integral structure.

7. The method of uniting separate metal plates by arc welding which consists in compressing the edges of the plates to be united, assembling the plates with such edges in proximity to form a welding groove, and fusing the edges of the plates in the region of such groove to weld the plates into an integral structure.

8. The method of uniting separate metal plates by electric welding which consists in compressing the edges of plates to be united to form thin edges thereon, assembling the plates with the said thin edges in proximity to form a welding groove, fusing the edges of the plates in the region of the groove by means of an electric arc conducted by a fusible weldrod, and filling the groove with welding material to constitute a welded joint and form the plates into an integral structure.

In testimony whereof, I have signed my name at Milwaukee, this 9th day of January, 1923.

R. STRESAU.

Witnesses:
W. F. WOOLARD,
ESTELLE M. KALUPY.